United States Patent
Feuillard et al.

(10) Patent No.: US 9,752,873 B2
(45) Date of Patent: Sep. 5, 2017

(54) TOOL FOR MEASURING GEOMETRICAL PARAMETERS OF A BLADE OR VANE IN A TURBOMACHINE

(71) Applicant: ALSTOM Technology Ltd, Baden (CH)

(72) Inventors: Bernard Feuillard, Wettingen (CH); Ernst Vogt, Remigen (CH); Fabian Gubelmann, Buchs (CH); Alexey Voskoboynikov, Moscow (RU)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 197 days.

(21) Appl. No.: 14/837,127

(22) Filed: Aug. 27, 2015

(65) Prior Publication Data

US 2016/0076868 A1    Mar. 17, 2016

(30) Foreign Application Priority Data

Sep. 16, 2014    (EP) .................................. 14185024

(51) Int. Cl.
G01B 5/20    (2006.01)
G01B 21/04    (2006.01)

(52) U.S. Cl.
CPC ........... *G01B 21/047* (2013.01); *G01B 5/205* (2013.01)

(58) Field of Classification Search
CPC ............................. G01B 5/205; G01B 21/047
USPC .................................. 33/645, 833, 534, 555
See application file for complete search history.

(56) References Cited

U.S. PATENT DOCUMENTS

| | | | |
|---|---|---|---|
| 3,110,112 A | 11/1963 | Dalgleish | |
| 3,639,994 A * | 2/1972 | Palmenberg | G01B 5/205 33/555 |
| 3,778,906 A * | 12/1973 | Palmenberg | G01B 5/20 33/555 |
| 4,146,967 A * | 4/1979 | Rohner | G01B 5/0002 33/530 |
| 4,322,887 A * | 4/1982 | Burton | G01B 5/14 33/552 |
| 4,327,495 A * | 5/1982 | Plante | G01B 5/0002 33/502 |
| 4,509,265 A * | 4/1985 | Donaldson | B23Q 3/18 33/552 |

(Continued)

FOREIGN PATENT DOCUMENTS

| | | |
|---|---|---|
| GB | 560 474 A | 4/1944 |
| WO | 2009/085430 A1 | 7/2009 |
| WO | 2013/050688 A1 | 11/2013 |

*Primary Examiner* — Yaritza Guadalupe-McCall
(74) *Attorney, Agent, or Firm* — Buchanan Ingersoll & Rooney PC

(57) ABSTRACT

A tool for measuring geometrical parameters of a vane or a blade of a turbomachine, particularly for measuring a distance between the tip of the vane or blade and a reference plane is provided. The tool includes a first guiding plate and a second guiding plate. The first guiding plate and the second guiding plate are spaced apart from each other in a defined position by means of at least two spacers. Each of the first guiding plate and the second guiding plate is equipped with a first through hole and one or more second through holes. The first through hole is designed to insert through an airfoil of said vane or blade. Each of the second through holes is designed to receive a length measuring tool, e.g. a depth gauge.

22 Claims, 3 Drawing Sheets

(56) References Cited

U.S. PATENT DOCUMENTS

| | | | | |
|---|---|---|---|---|
| 4,520,569 A * | 6/1985 | Ireland | G01B 5/00 33/501.9 |
| 4,611,408 A | 9/1986 | Plante | |
| 4,718,172 A * | 1/1988 | Rouse | G01B 5/24 33/530 |
| 4,811,253 A * | 3/1989 | Johns | G05B 19/401 33/546 |
| 4,908,782 A * | 3/1990 | Pekarek | G01B 11/245 33/546 |
| 5,047,966 A * | 9/1991 | Crow | G05B 19/401 33/504 |
| 6,209,216 B1 * | 4/2001 | Bear | G01B 11/245 33/551 |
| 7,178,255 B1 * | 2/2007 | Roesel | F01D 25/285 33/549 |
| 7,681,325 B2 * | 3/2010 | Sassatelli | F01D 21/003 33/783 |
| 8,769,839 B1 * | 7/2014 | Paesano | G01C 9/005 33/301 |
| 8,857,070 B2 * | 10/2014 | Niederbremer | F01D 17/162 33/1 N |
| 2005/0217131 A1 * | 10/2005 | Varsell | G01B 3/14 33/562 |
| 2005/0268461 A1 | 12/2005 | Ouellette | |
| 2006/0213282 A1 | 9/2006 | Prevey | |
| 2009/0064520 A1 * | 3/2009 | Sherlock | F01D 25/285 33/562 |
| 2009/0165317 A1 * | 7/2009 | Little | G01B 5/012 33/503 |
| 2010/0205816 A1 * | 8/2010 | Wu | G01B 5/008 33/503 |
| 2015/0075265 A1 * | 3/2015 | Memmer | F01D 11/14 33/503 |
| 2016/0076868 A1 * | 3/2016 | Feuillard | G01B 21/047 33/833 |

* cited by examiner

TOOL FOR MEASURING GEOMETRICAL PARAMETERS OF A BLADE OR VANE IN A TURBOMACHINE

CROSS-REFERENCE TO RELATED APPLICATIONS

This application claims priority to EP Application No. 14185024.8 filed Sep. 16, 2014, the contents of which are hereby incorporated in its entirety.

TECHNICAL FIELD

The invention generally relates to the technical field of turbomachines. More specifically, the invention relates to a tool for measuring geometrical parameters of a blade or a vane in a turbomachine, e.g. the length of an airfoil, which enables a measurement on the bladed rotor or on the bladed stator as well as on standing alone parts.

BACKGROUND

In the attempt to optimize the efficiency of turbomachines, e.g. compressors, gas turbines, steam turbines, any processes resulting in losses are minimized as far as possible. Losses are caused by leakage flows which pass through the gap between a rotating component and a stationary component of the turbomachine. In order to reduce the leakage flow, the clearance between these components has to be set to a minimum during operation.

From several reasons mutual contacts between the surfaces of the rotating and stationary components occur during operation with the consequence of surface abrasion and thus increasing gap and leakage flow.

There are different methods to validate clearance prediction in a turbomachine. One way of validation is to assess the rubbing that occurs during operation by measuring the rub at the components, i.e. measuring the casing rub and the blade wear or the shaft rub and the vane wear.

The increase in clearance between the blade tip and the stator comprises the casing rub and the blade wear. Considering the machine efficiency a rub at the stationary component is generally preferred compared to the wear of the rotating component. E.g. the casing rub leads to a local increase in clearance, whereas the wear at the blade tip leads to a clearance increase all around the section.

Measuring the blade wear gives a feedback on the rub proportion that occurs at the blades.

Known solutions for monitoring the wear at a component of a turbomachine without removal of this component from the machine comprise to provide the relevant surface of said component with a marker. At least one, preferably a number of hollow markings of a determined depth is machined into the relevant surface of the component to be monitored. Endoscopic examinations are carried out successively to provide an image signal of the markings.

Such a method for monitoring wear at compressor blades using markers is disclosed in WO 2013/050688.

It is a disadvantage that this method requires a modification of the individual component, such as blades or vanes.

According to another method, disclosed in WO 2009/085430, the height of a gap between a blade tip and the inner surface of the surrounding casing in a gas turbine engine is measured by a measuring tool. This measuring tool essentially consists of a frame, comprising two components: a backing portion and an extended portion. The backing portion includes an attachment portion, designed to install the tool on the fan case of the gas turbine engine. For this purpose measuring tool and fan case are equipped with respective fastening means, e.g. a flange at the fan case has holes for receiving screws from the backing portion of the frame. And the extended portion consists of or holds a supporting arm for a sensor. One end of the supporting arm is attached to the backing portion and its other end is free and holds the thickness measuring sensor. The length and width of the supporting arm are designed to protrude into the gap between the blade tip and the inner surface of the casing. The sensor is a non-contact sensor, such as an optical or a capacitive position sensor. After the measuring tool has been locked in its position at the engine, the fan blades are rotated and the sensor may obtain data of each of the rotating blades. By lengthwise adjustment of the supporting arm tip clearance measurements in different longitudinal positions can be made.

SUMMARY

It is an object of the present invention to provide a tool for measuring geometrical parameters of a vane or blade, e.g. a length of the airfoil, in an easy way. According to another object the tool must deliver the measured data in a reproducible manner.

Finally, the tool should be applicable to standing alone parts as well as to a bladed rotor or stator.

These and other objects are obtained by a tool for measuring geometrical parameters of a vane or blade according to claim 1.

The tool according to the invention, which is especially suitable for measuring a distance between the tip of the vane or blade and a reference plane, e.g. a platform surface of said vane or blade, comprises a first guiding plate and a second guiding plate, the first guiding plate and the second guiding plate being fixed in a defined position to each other by means of at least two spacers, whereby both guiding plates, said first plate and said second plate, are equipped with a first through hole, being designed to pass through an airfoil of a vane or blade and at least one second through hole, being designed to receive a length measuring tool, such as a depth gauge or a caliber.

For operation, the tool is attached to the airfoil by passing the airfoil through said first through holes in the guiding plates. For this purpose these holes are shaped and dimensioned in a way that provides a clearance fit between the tool and the airfoil of the vane or blade. In addition, the design of these through holes has to ensure a stable and repeatable position of the tool on the vane or blade.

According to a first preferred embodiment at least one of said guiding plates is assembled from two elements with differing functions, a first element to lend stiffness to the tool and a second element to ensure the correct, i.e. stable and repeatable, position of the tool on the airfoil.

Specifically, the guiding plates are assembled from two plate-shaped elements.

According to a particularly preferred embodiment said second element, ensuring the correct position of the tool on the airfoil, is made of a material having a lower hardness than the surface material of the airfoil.

This measure avoids damaging of the airfoil surface during operation, especially when putting the tool on the airfoil or drawing off from the airfoil.

According to another preferred embodiment the guiding plates are equipped with at least two, preferably three or even more through holes for inserting a length measuring tool.

Specifically, these holes may be positioned in a way that enables measurements of the distance between the tip of the airfoil and a reference plane at the leading edge, at the trailing edge and at at least one position between the leading edge and the trailing edge of the airfoil.

More specifically, the positions of said through holes may be additionally varied in a way to reach different reference planes related to the same point at the airfoil tip.

This measure allows to perform distance measurements at selected relevant positions along the airfoil and between the tip of the airfoil and a selected reference plane.

The relevant reference plane may be a part of the respective vane or blade, particularly its platform, or may be another surface nearby the vane or blade, such as an inner surface of the casing or a surface of the rotor shaft.

The tool according to the invention enables measuring the vane or blade airfoil wear that occurs during operation and it enables measuring the position of the blade tip compared to the rotor shaft external surface on the bladed rotor or the position of the vane tip compared to the stator inner surface on the bladed stator, which allows the assessment of bladed rotor or casing diameter measurements and the assessment of the blade position inside the groove.

BRIEF DESCRIPTION OF THE DRAWINGS

These and further embodiments and advantages of the present invention are now to be explained more closely by means of and with reference to the drawings.

DETAILED DESCRIPTION

Figure 1:
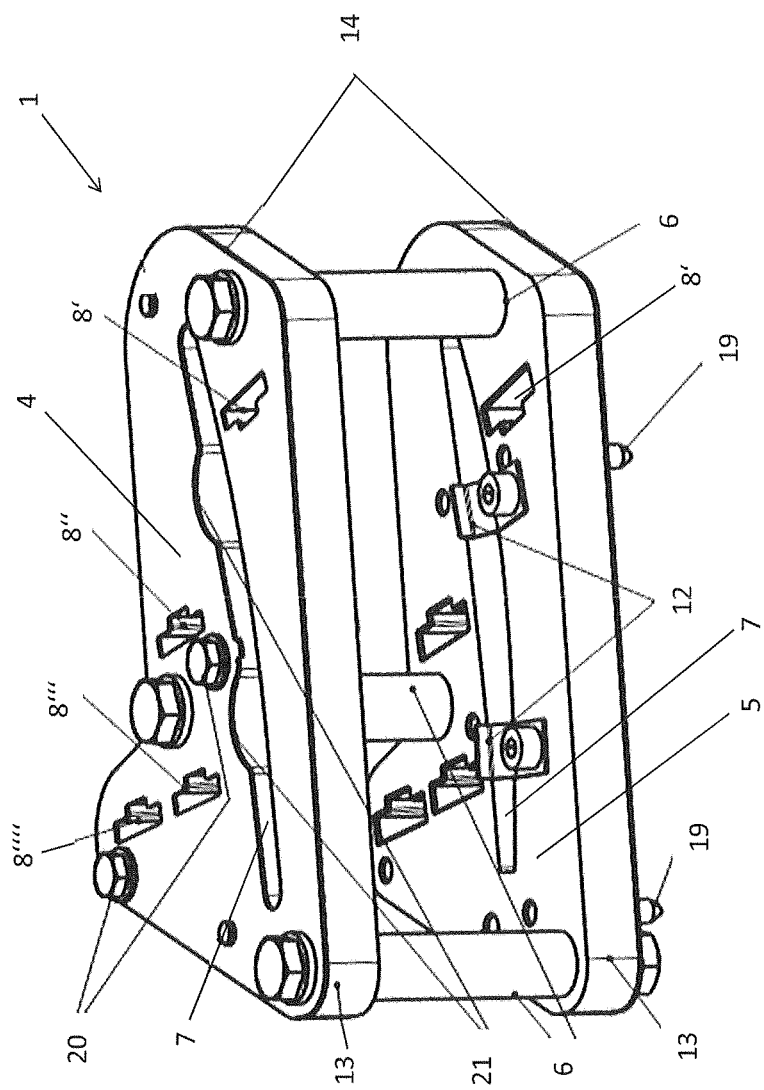
FIG. 1 shows a tool for measuring geometrical parameters of a vane or blade according to the invention in a perspective view.

FIG. 1 illustrates in a perspective view a preferred embodiment of a tool 1 for measuring distances between the tip of an airfoil of a vane or a blade and a reference plane. The measuring tool 1 according to the invention essentially comprises two guiding plates 4, 5, being fixedly arranged to each other by a number of bolted connection rods 6. The concrete outer shape of these guiding plates 4, 5, their dimension and their distance to each other depend primarily on the dimension of the airfoils to be measured and, if used for measurements on a bladed rotor or stator, additionally depend on the distance between adjacent airfoils, i.e. these parameters may vary depending on the individual case.

The guiding plates 4, 5 are equipped with at least two types of through holes 7, 8: a first through hole 7, designed to insert through the airfoil of the vane 15 or blade 17 to be measured, and at least one, preferably a number of additional through holes 8, designed to receive and guide a length measuring tool, e.g. a depth gauge.

Figure 2:
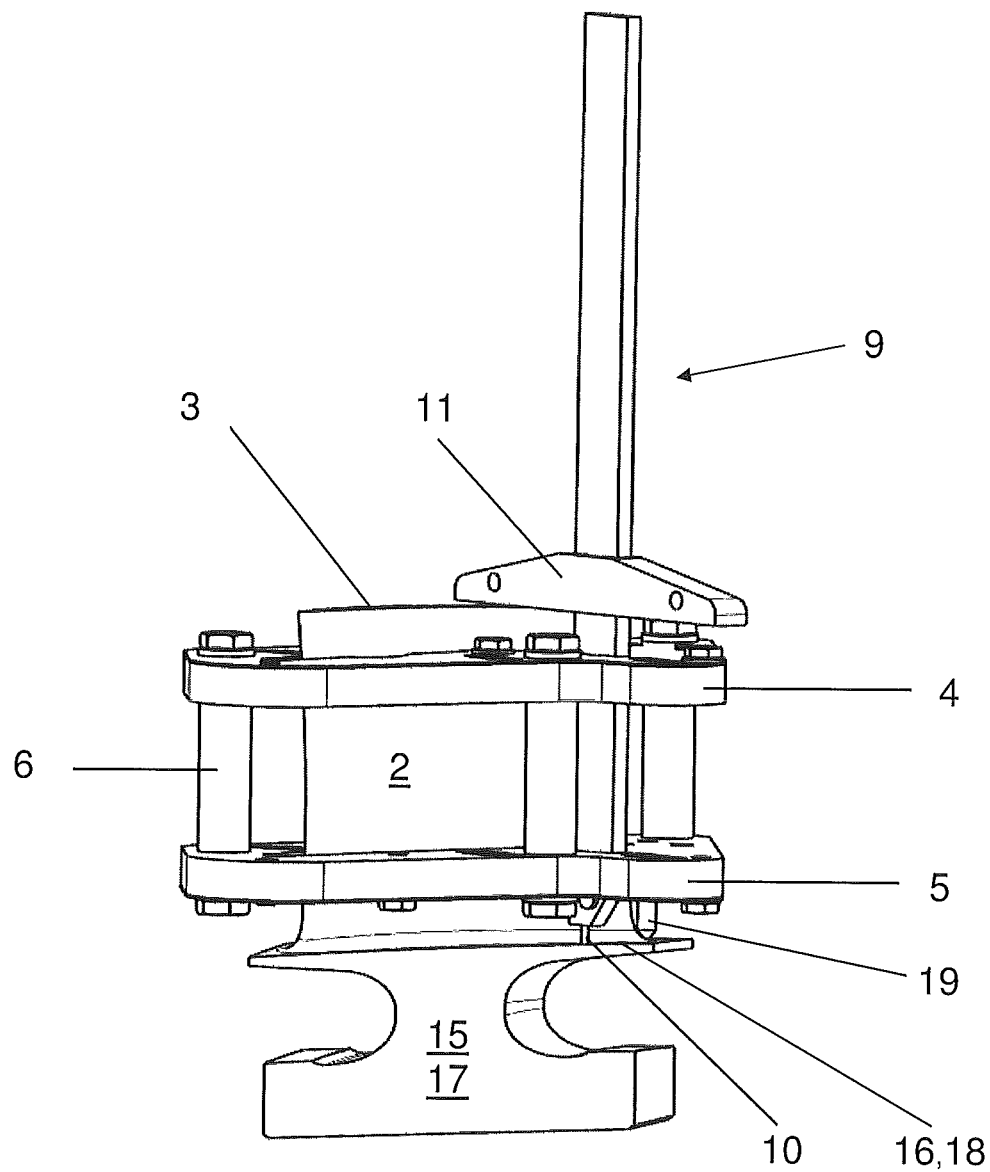
FIG. 2 shows the tool in operating position on a vane or blade with an attached depth gauge.

The exemplary embodiment of a tool 1, as shown in FIGS. 1 and 2, is equipped with four through holes 8', 8", 8'", 8"" for inserting and accurately guiding the depth gauge 9. These holes 8', 8", 8'", 8"" are disposed at different positions relative to the airfoil 2. Three through holes 8', 8", 8'" are disposed along the airfoil 2 between its leading edge and its trailing edge to measure the distance between the tip 3 of the vane 15 or blade 17 and its platform 16, 18, i.e. the length of the airfoil 2, at different positions between leading edge and trailing edge. Inserted into hole 8', the depth gauge 9 measures the airfoil length in the area of the leading edge. Hole 8" enables a length measurement at a point between leading edge and trailing edge and hole 8'" enables a length measurement of the airfoil 2 in the region of the trailing edge.

Compared to the above-mentioned through holes 8', 8" and 8'" the fourth through hole 8"" is positioned more distantly from the airfoil 2. This hole 8"" enables to measure a distance between the tip 3 of the airfoil 2 and another reference plane instead of the platform, particularly the outer surface of the rotor shaft (in case of a blade) or the inner surface of the casing (in case of a vane). As positioned in line with through hole 8'", the depth gauge 9 targets at the same point of the airfoil tip 3, when inserted either in hole 8'" or in hole 8"". This enables a comparison between both values.

As mentioned before, the through holes 7 in the guiding plates 4, 5 are designed to insert through the airfoil 2. On the one hand this hole 7 has to provide a sufficient clearance fit between airfoil 2 and tool 1 for easily inserting and removing, but on the other hand, for unbiased and reproducible measuring results, an accurate positioning between the tool 1 and the airfoil 2 is requested. For this purpose, the guiding plates 4, 5 are equipped with elastic means, e.g. leaf springs 12, and/or excentric wheels 22, acting against the airfoil 2.

To ensure a stable position of the tool 1 on the airfoil 2, according to the exemplary embodiment of FIG. 1 the guiding plate 5, which is close to the platform 16, 18 during operation, is equipped with two leaf springs 12 and the guiding plate 4, during operation close to the tip 3 of the airfoil 2, is equipped with a third leaf spring 12. One or more excentric wheels 22 may be added to fix the tool 1 on the airfoil 2, particularly when working in situ on stator vanes 15 nearby 12 o'clock position. To avoid any damages to the airfoil 2 the springs 12 and an outer edge of the excentric wheel 22 are made of a material of low hardness, such as copper.

For ease of work the outer contour of the through hole 7 in the upper guiding plate 4, i.e. the guiding plate close to the airfoil tip 3 during operation, is provided with one or more pockets 21. These pockets 21 may enable the operator to check the contact points between the airfoil 2 and the lower guiding plate 5.

The guiding plates 4, 5 are assembled from two individual elements 13, 14 with individual functions. Both elements 13, 14 are plates. The relatively thick plate 13 ensures a sufficient stiffness of the tool 1 and the other, relatively thin plate 14 ensures an accurate positioning of the tool 1 on the airfoil 2 and an accurate guiding of the measuring tool 9 in the through holes 8. The materials for the two plates 13, 14 are chosen according to their function, e.g. aluminum for the plate 13 with basically the stiffness function and copper for the plate 14 with primarily the guiding function.

Both plates 13. 14 are conjoined by bolts 20.

By preferably two support feet 19 at the bottom of the lower plate 5 the tool 1 supports on the platform 16, 18 of the vane 15 or blade 17 during operation.

FIG. 2 illustrates an exemplary embodiment of the tool 1 according to the invention in operating position on a vane 15 or blade 17. The tool 1 is attached to the vane 15 or blade 17 by insertion of the airfoil 2 through the through holes 7 of the guiding plates 4, 5. The leaf springs 12 (see FIG. 1) push against the airfoil 2 and support a stable position of the tool 1 on the blade 17. The spacers 6 define the distance between the upper guiding plate 4, i.e. the guiding plate close to the tip 3 of the airfoil 2 under operation, and the lower guiding plate 5, close to the platform 16, 18 of the vane 15 or blade 17 under operation. This distance has to be dimensioned shorter than the length of the airfoil 2. The lower guiding plate 5 is equipped with two supporting feet 19 at its bottom side. These two feet 19 rest on the platform 16, 18 of vane 15 or blade 17.

A common depth gauge 9 is inserted through the through holes 8' of the guiding plates 4, 5. The through holes 8 are designed to ensure accurate positioning of the depth gauge 9. The lower part of the depth gauge 9 has a contact area or a contact pin 10 to the surface of the platform 16, 18. The upper part is equipped with a movable measuring bridge 11 to be placed upon the airfoil tip 3.

Figures 3A, 3B:
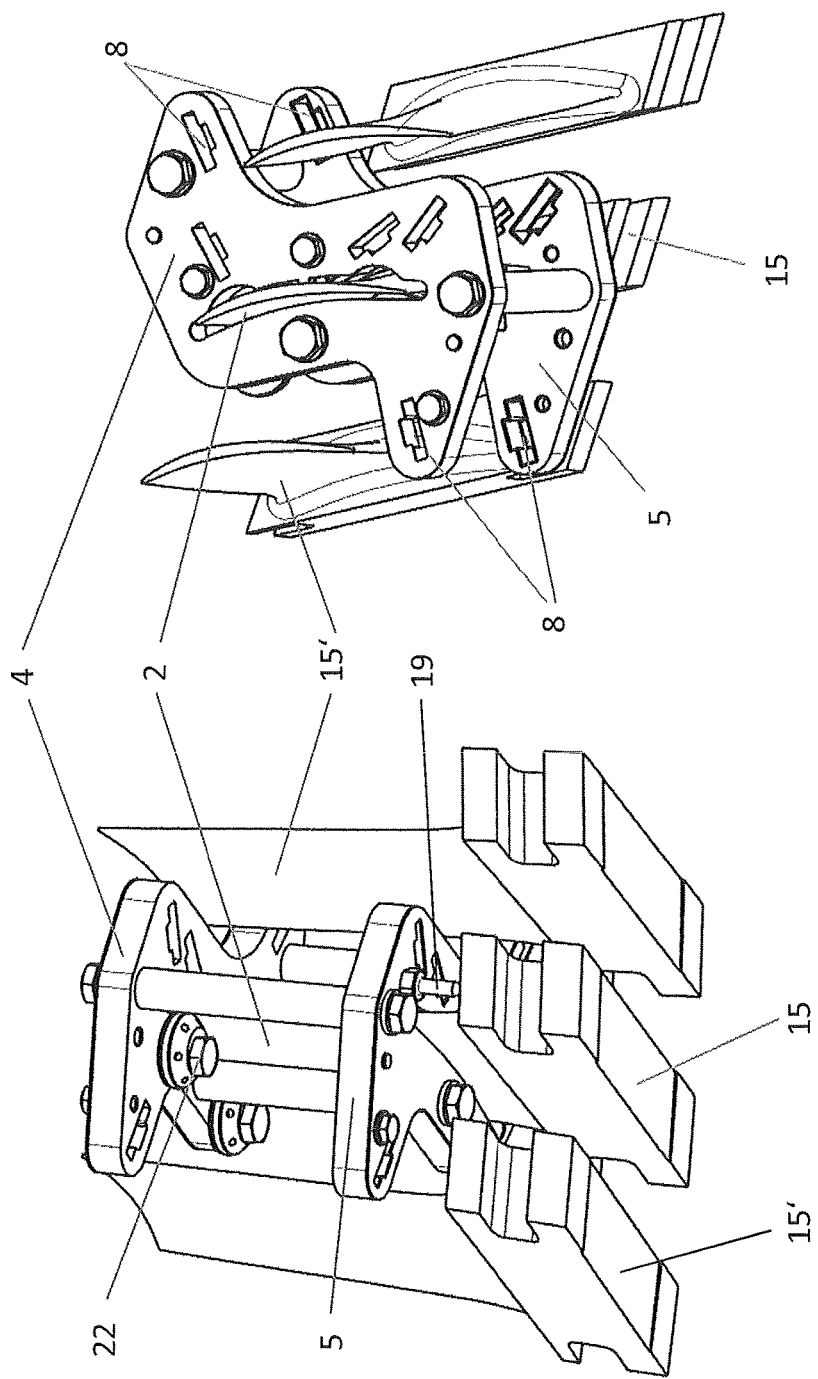
FIG. 3A-3B shows in two different views the tool according to the present invention on a vane.

FIGS. 3*a* and 3*b* illustrate the use of the measuring tool 1 on a bladed stator. The tool 1 is attached to a vane 15. The guiding plates 4, 5 of the tool 1 are shaped in a way that on the one hand enough space to adjacent vanes 15' remains to avoid collision between a component of the tool 1 and an adjacent vane 15' and on the other hand that the depth gauge 9 can reach the relevant reference planes. The feet 19 on the bottom side of the lower plate 5 rest on the platform 16 of the vane 15. The distance between the upper plate 4 and the lower plate 5 of the tool 1 is dimensioned in such a way that the tip 3 of the airfoil 2 sufficiently projects over the upper plate 4. This shown embodiment has a number of five through holes 8 for inserting the depth gauge 9 at different positions relative to the airfoil 2, enabling the depth gauge 9 to reach different points at the airfoil 2 and different reference planes, including the platform 16 of the vane 15. The corresponding through holes 8 in the guiding plate 4 and the guiding plate 5 are aligned in radial direction, i.e. the measurement axis along which the depth gauge 9 is guided in the individual through holes 8', 8", 8''' . . . crosses the rotor axis. Consequently, the measured values of the depth gauge 9 show radial lengths.

The invention claimed is:

1. A tool for measuring geometrical parameters of a vane or a blade of a turbomachine, particularly for measuring a distance between the tip of the vane or blade and a reference plane, the tool comprising a first guiding plate and a second guiding plate, the first guiding plate and the second guiding plate being spaced apart from each other in a defined position by means of at least two spacers, wherein each of the first guiding plate and the second guiding plate is equipped with a first through hole and one or more second through holes, the first through hole being designed to insert through an airfoil of said vane or blade and each of the second through holes being designed to receive a length measuring tool.

2. The tool according to claim 1, wherein the reference plane is a surface of a platform of the vane or the reference plane is an inner surface of a casing of the turbomachine.

3. The tool according to claim 1, wherein the reference plane is a surface of a platform of the blade or the reference plane is an external surface of the rotor shaft.

4. The tool according to claim 1, wherein the first guiding plate and the second guiding plate are spaced apart from each other at a distance that is shorter than the distance between the tip and the platform of the vane or blade to be measured.

5. The tool according to claim 1, wherein at least one, preferably each, of the first guiding plate and the second guiding plate is assembled from two elements with differing functions, wherein one element lends stiffness to the tool structure and the other element ensures a stable guiding of the airfoil and/or the length measuring tool.

6. The tool according to claim 5, wherein at least one, preferably each, of the guiding plate and the guiding plate is assembled from two plate-shaped elements of different materials.

7. The tool according to claim 6, wherein the guiding plates are assembled from two plates, wherein one plate is based on aluminum.

8. The tool according to claim 6, wherein the guiding plates are assembled from two plates, wherein one plate is based on copper.

9. The tool according to claim 6, wherein the two plate-shaped elements are detachably interconnected by bolts.

10. The tool according to claim 1, wherein the through holes, designed to receive the length measuring tool, are aligned such that the measured values are radial lengths, i.e. when operating in situ, the axis along which the length measuring tool is guided, crosses the rotor axis.

11. The tool according to claim 10, wherein the guiding plates are equipped with at least four through holes for the length measuring tool.

12. The tool according to claim 1, wherein the at least four through holes for the length measuring tool are positioned in a way that enables measurements of a distance between the tip of the airfoil and a reference plane at the leading edge, at the trailing edge and at least one position between the leading edge and the trailing edge of the airfoil, wherein at least two positions target at the same point on the tip but reach different reference planes.

13. The tool according to claim 12, wherein the different reference planes are the platform of the vane and an inner surface of the casing of the turbomachine.

14. The tool according to claim 12, wherein the different reference planes are the platform of the blade and the external surface of the rotor shaft.

15. The tool according to claim 14, wherein the length measuring tool is a depth gauge or a caliber.

16. The tool according to claim 1, wherein an accurate and stable positioning of the tool on the airfoil elastic means, e.g. leaf springs are installed on the guiding plates extending into the first through hole for pushing against the airfoil during operation.

17. The tool according to claim 16, wherein the elastic means are made of a material having a lower hardness than the surface material of the airfoil.

18. The tool according to claim 17, wherein elastic means are made of copper.

19. The tool according to claim 16, wherein the elastic means are leaf springs.

20. The tool according to claim 19, wherein three leaf springs are installed.

21. The tool according to claim 16, wherein in addition to the elastic means one or more excentric wheels for pushing against the airfoil are installed.

22. The tool according to claim 1, wherein the bottom of the guiding plate, during operation nearby the platform of the vane or blade, is equipped with two support feet.

\* \* \* \* \*